United States Patent [19]

Yamada et al.

[11] Patent Number: 5,622,407
[45] Date of Patent: Apr. 22, 1997

[54] SEAT APPARATUS

[75] Inventors: Yukifumi Yamada, Toyota; Hiroyuki Okazaki, Anjo; Yoshihiro Hirate, Toyota, all of Japan

[73] Assignee: Aisin Seiki Kabushiki Kaisha, Kariya, Japan

[21] Appl. No.: 343,964

[22] Filed: Nov. 18, 1994

[30] Foreign Application Priority Data

Nov. 19, 1993 [JP] Japan .................................. 5-290490
Mar. 18, 1994 [JP] Japan .................................. 6-049134

[51] Int. Cl.⁶ .................................................... B60N 2/02
[52] U.S. Cl. ................................ 297/366; 297/367
[58] Field of Search ................................ 297/366, 367, 297/368, 365, 363

[56] References Cited

U.S. PATENT DOCUMENTS

| | | | |
|---|---|---|---|
| 4,087,885 | 5/1978 | Gillentine | 297/367 |
| 4,227,741 | 10/1980 | Gross et al. | |
| 4,384,744 | 5/1983 | Barley | 297/367 |
| 4,770,464 | 9/1988 | Pipon et al. | 297/367 |
| 4,789,205 | 12/1988 | Pipon et al. | 297/367 |

FOREIGN PATENT DOCUMENTS

| | | | |
|---|---|---|---|
| 2258817 | 8/1975 | France | 297/366 |
| 2578602 | 9/1986 | France | 297/367 |
| 2006270 | 9/1971 | Germany | 297/366 |
| 2364754 | 8/1974 | Germany | 297/367 |
| 2757907 | 7/1979 | Germany | |
| 2-128707 | 5/1990 | Japan | |
| 0893419 | 4/1962 | United Kingdom | 297/367 |
| 2117440 | 10/1983 | United Kingdom | 297/367 |

OTHER PUBLICATIONS

Official Letter dated Aug. 7, 1996.
English translation of Official Letter—3 pages.

*Primary Examiner*—Peter M. Cuomo
*Assistant Examiner*—Anthony D. Barfield
*Attorney, Agent, or Firm*—Finnegan, Henderson, Farabow, Garrett and Dunner, L.L.P.

[57] ABSTRACT

A seat apparatus includes a lower arm for attachment to a seat-cushion, an upper arm for attachment to a seat-back, a shaft mounted to the upper arm and supported rotatably by the lower arm, a locking mechanism disposed between the lower arm and the upper arm and having a pawl device and a ratchet which are in meshing engagement with each other, and a cam for establishing an engagement between the pawl device and the ratchet when the cam is rotated in one direction and brought into engagement with the pawl device, establishing a disengagement between the pawl device and the ratchet when the cam is rotated in the other direction and disengaged from the pawl device, the cam being mounted on the shaft such that the cam is rotatable with the shaft but movable toward the pawl device when the cam engages with pawl device.

4 Claims, 5 Drawing Sheets

SEAT APPARATUS

BACKGROUND OF THE INVENTION

1. Field Of Invention

The present invention relates to a seat apparatus, and in particular, to a seat apparatus wherein a seat-back is brought into reclining movement relative to a seat-cushion.

2. Description of Related Art

A conventional seat apparatus of the kind disclosed in, for example, Japanese Patent Laid-open Print No. Hei2-128707 published in 1990 without examination includes a lower arm for fixing a seat-cushion and an upper arm for fixing a seat-back. A shaft pivots the upper arm to the lower arm, a locking mechanism, which is disposed between the lower arm and the upper arm, has a combination of a pawl and a ratchet and a cam rotatably mounted on the shaft for moving the pawl, wherein an engagement between the pawl and the ratchet is maintained by establishing an engagement between the cam and the pawl in order to prevent a reclining movement of the seat-back relative to the seat-cushion. The reclining movement of the seat-back relative to the seat-cushion is permitted when the cam is released from the pawl. A clearance is defined between the cam and the shaft in order to ensure the engagement therebetween to compensate for manufacturing tolerances.

However, such a clearance sometimes may bring about an unexpected movement of the cam, thereby causing an incorrect or imperfect engagement between the cam and the pawl.

SUMMARY OF THE INVENTION

It is, therefore, a primary object of the present invention to provide a seat apparatus without the foregoing drawback.

It is another object of the present invention to provide a seat apparatus wherein a perfect engagement between the cam and the pawl can be established.

In order to attain the foregoing objects, a seat apparatus includes a lower arm for attaching to a seat-cushion, an upper arm for attaching to a seat-back, a shaft mounted to the upper arm and supported rotatably by the lower arm, a locking mechanism disposed between the lower arm and the upper arm and having a pawl means and a ratchet in meshing engagement with each other, and a cam for establishing engagement between the pawl means and the ratchet when the cam is rotated in one direction and brought into engagement with the pawl means and for establishing disengagement between the pawl means and the ratchet when rotated in the other direction and disengaged from the pawl means, the cam being mounted on the shaft such that the cam is rotatable with the shaft but is movable toward the pawl means when the cam engages the pawl means.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF THE PREFERRED EMBODIMENTS

Embodiments of the present invention will be described below in detail with reference to the accompanying drawings.

Figure 1:
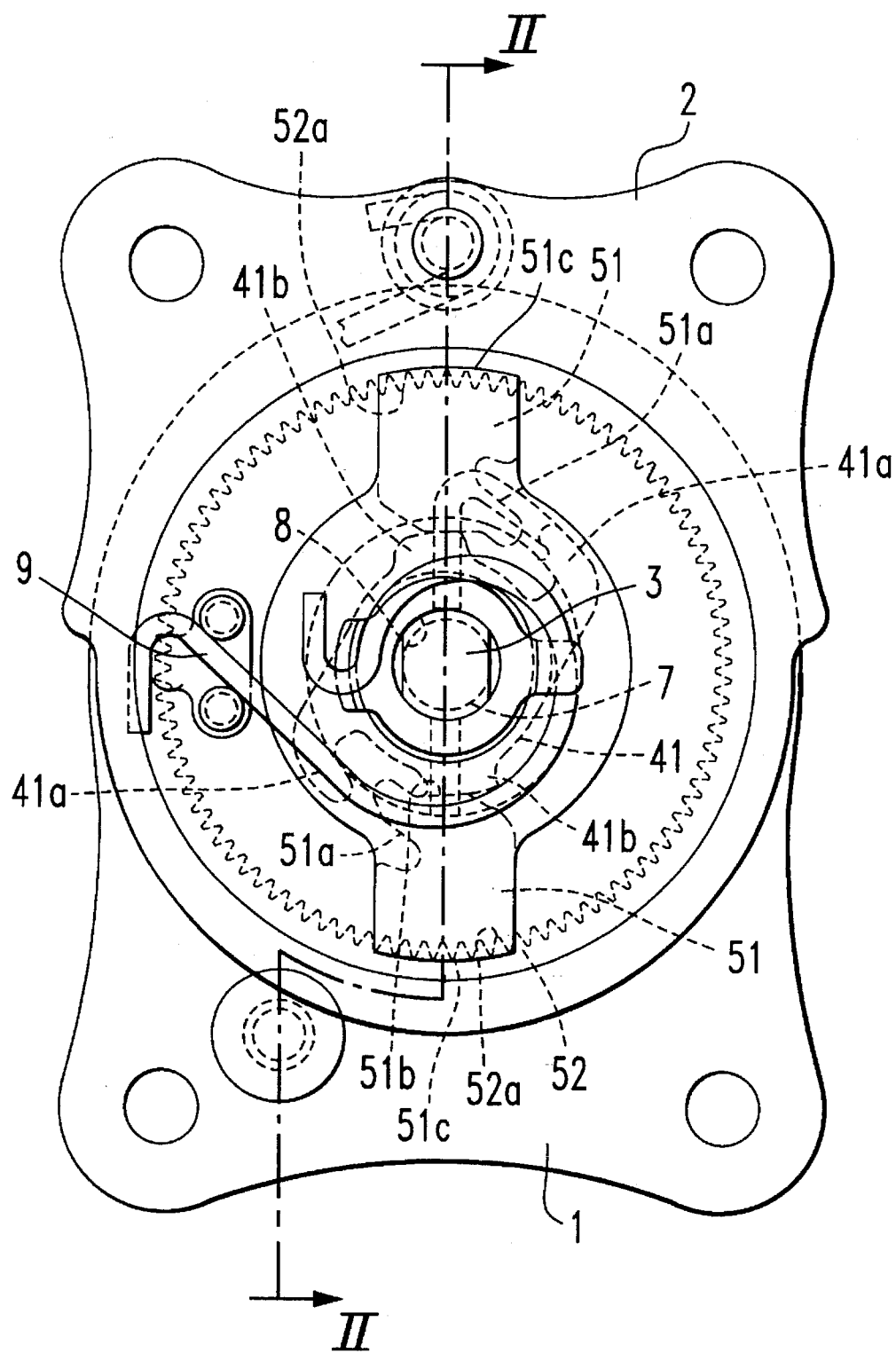
FIG. 1 is a side view of a seat apparatus according to a first embodiment of the present invention.
Figure 2:
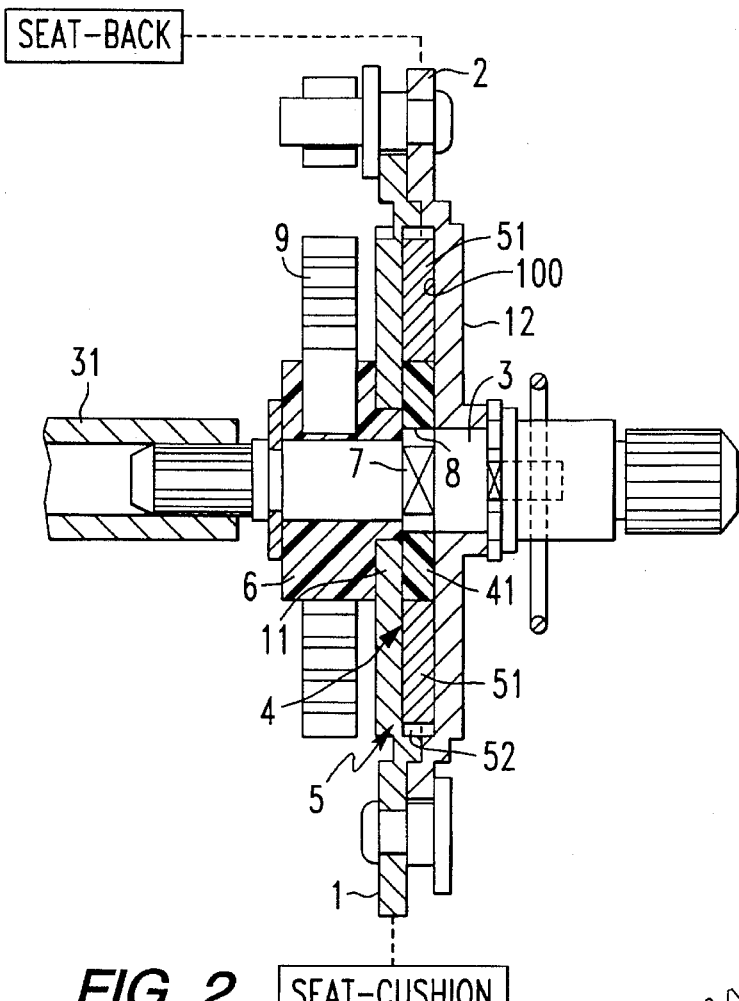
FIG. 2 is a cross-sectional view taken along line II—II in FIG. 1.
Figure 3:
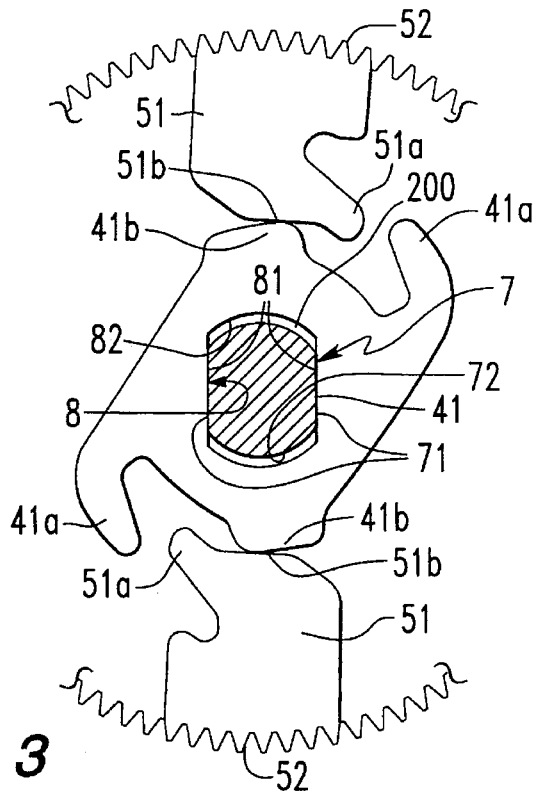
FIG. 3 is an enlarged fragmentary view of a principal portion of the seat apparatus of FIG. 1.

Referring first to FIGS. 1 to 3 inclusive, a seat apparatus includes a lower arm 1 for attaching to or fixing a seat cushion. The lower arm 1 is formed with a supporting portion 11 (FIG. 2) in which a rightward facing opening is defined. An upper arm 2 for attaching to or fixing a seat-back is also formed with a supporting portion 12 in which a leftward facing opening is defined. The lower arm 1 and the upper arm 2 are arranged in a side-by-side relationship, thereby establishing a space 100 between the supporting portions 11 and 12. A shaft 3 passes through the supporting portions 11 and 12 of the lower arm 1 and the upper arm 2, respectively, in such a manner that the lower arm 1 is supported on the shaft 3 via a bush 6 and the upper arm 2 is set to be rotatable about the shaft 3 so as to make a reclining angle relative to the lower arm 1.

Within the space 100, a pair of pawls 51 and a ratchet 52 which constitute a locking mechanism 5, and a cam 41 which constitutes a releasing mechanism 4 are accommodated. The cam 41 is mounted on the shaft 3 so as to be rotatable therewith in unison, but is movable along the shaft in a radial direction. The relationship between the cam 41 and the shaft 3 will be explained in detail later. The ratchet 52 is formed along an inner periphery of the rightward-facing opening of the lower arm 1. The pawl 51 is disposed between the cam 41 and the ratchet 52 in such a manner that the pawl 51 is movable in the radial direction of the shaft 3 so as to be guided along the lower arm 1 and the upper arm 2, an inner end of the pawl 51 is in contact with an outer periphery of the cam 41, and an outer end in the form of a geared structure is in meshing engagement with the ratchet 52.

The cam 41 is provided with a pair of legs 41a which are 180 degrees out of phase with each other. The pawl 51 is provided with a pair of cam portions 51a which are 180 degrees out of phase with each other. The legs 41a of the cam 41 are expected to be engaged with the corresponding cam portions 51a of the pawl 51 upon rotation of the pawl 41. A continual contact between the pawl 51 and the cam 41 is established by a pair of projections 41b of the cam 41 and a pair of corresponding surfaces 51b of the pawl 51. A geared portion 52a of the pawl 51 is in meshing engagement with a geared portion 52a of the ratchet 52.

A right end of the shaft 3 is connected to a handle (not shown) and a left end of the shaft 3 is connected to a right end of rod 31. A left end (not shown) of the rod 31 is connected with a mechanism (not shown) which is similar to the illustrated mechanism. In order to facilitate a smooth rotation of the shaft 3, the bush 6 is used. On the bush 6, there is mounted a spiral spring 9 in such a manner that an inner end and an outer end thereof are secured to the bush 6 and the upper arm 2, respectively. The spiral spring 9 serves for assisting a counter-clockwise rotation (in FIG. 1) of the lower arm 1 relative to the upper arm 2.

As best shown in FIGS. 1 and 3, the shaft 3 has formed thereon a connecting portion 7 formed thereon whose cross-section is constituted by a pair of parallel flat surfaces 71 and a pair of arcuate surfaces 72. The cam 41 is formed therein with an aperture 8 enclosed by a pair of parallel flat peripheries 81 and a pair of arcuate peripheries 82. Under the illustrated condition, each flat periphery 81 of the aperture 8 of the cam 41 is in sliding engagement with the corresponding flat surface 71 of the connecting portion 7 of the shaft 3, and the curvature of each arcuate periphery 82 is set to be larger than that of the corresponding arcuate surface 72 so as to define therebetween a clearance 200.

While each of the pawls 51 is prevented from being moved as illustrated, the reclining movement of the upper arm 2 relative to the lower arm 1 cannot occur. When the shaft 3 is rotated in the counter-clockwise direction in FIGS. 1 and 3, the cam 41 also is rotated together with the shaft 3 in the counter-clockwise direction, so that the contact of the cam 41 with each of the pawls 51 is released and the pawls 51 are brought into movement toward the shaft 3 after engagement of each of the legs 41a of the cam 41 with the corresponding cam portion 51a of the pawl 51. Thus, the ratchet 52 is disengaged from each of the pawls 51, thereby permitting the upper arm 2 to recline relative to the lower arm 1. It is to be noted that the clockwise rotation of the resultant shaft 3 will realize or establish the illustrated condition.

Even though the design relationship between the cam 41 and each of the pawls 51 is not exactly met under the manufacturing process, the space 200 enables the movement of the cam 41 relative to the shaft 3. Thus, an imperfect or insufficient contact of the cam 41 with each pawl 51 can be prevented. In addition, the movement of the cam 41 relative to the shaft 3 is restricted to the movement direction of each pawl 51 due to the sliding movement of the flat periphery 82 of the aperture 8 of the cam 41 with the corresponding flat surface 72 of the shaft 3. Thus, a point at which the cam 41 contacts each of the pawls 51 fails to shift even such a movement of the cam 41, thereby establishing a stable contact between the cam 41 and each of the pawls 51.

Figure 4:
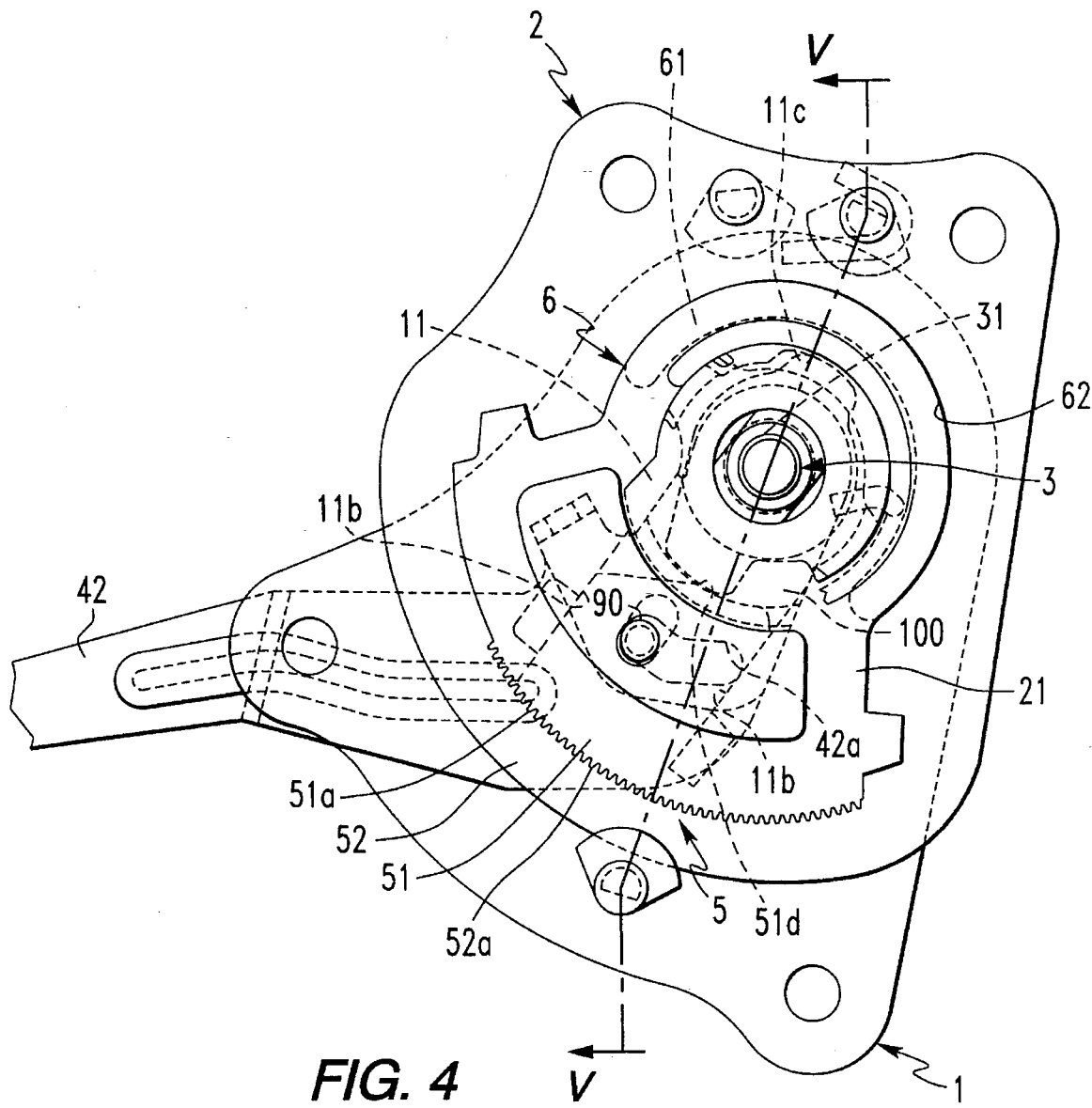
FIG. 4 is a side view of a seat apparatus according to a second embodiment of the present invention.
Figure 5:
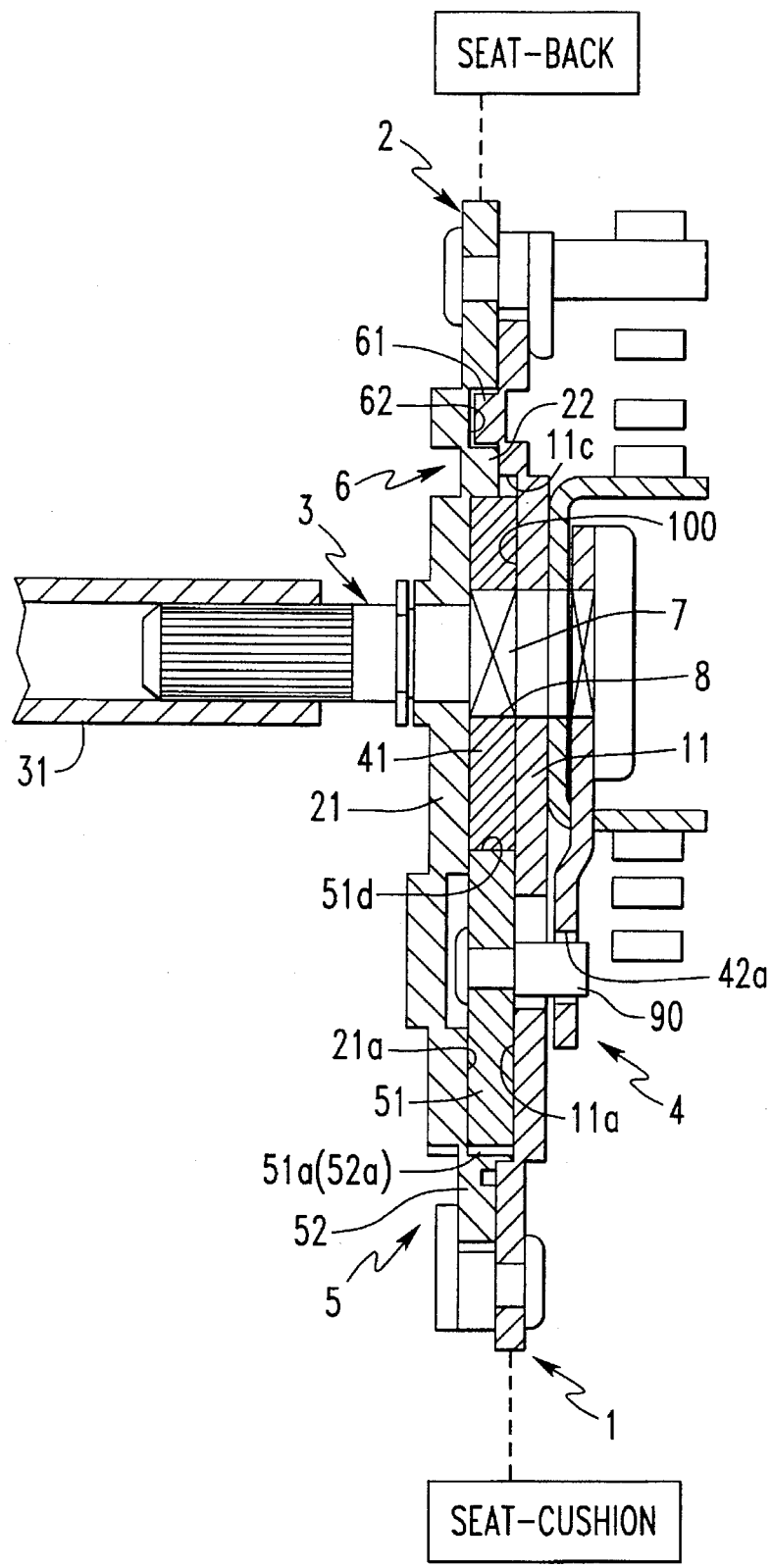
FIG. 5 is a cross-sectional view taken along line V—V in FIG. 4.
Figure 6:
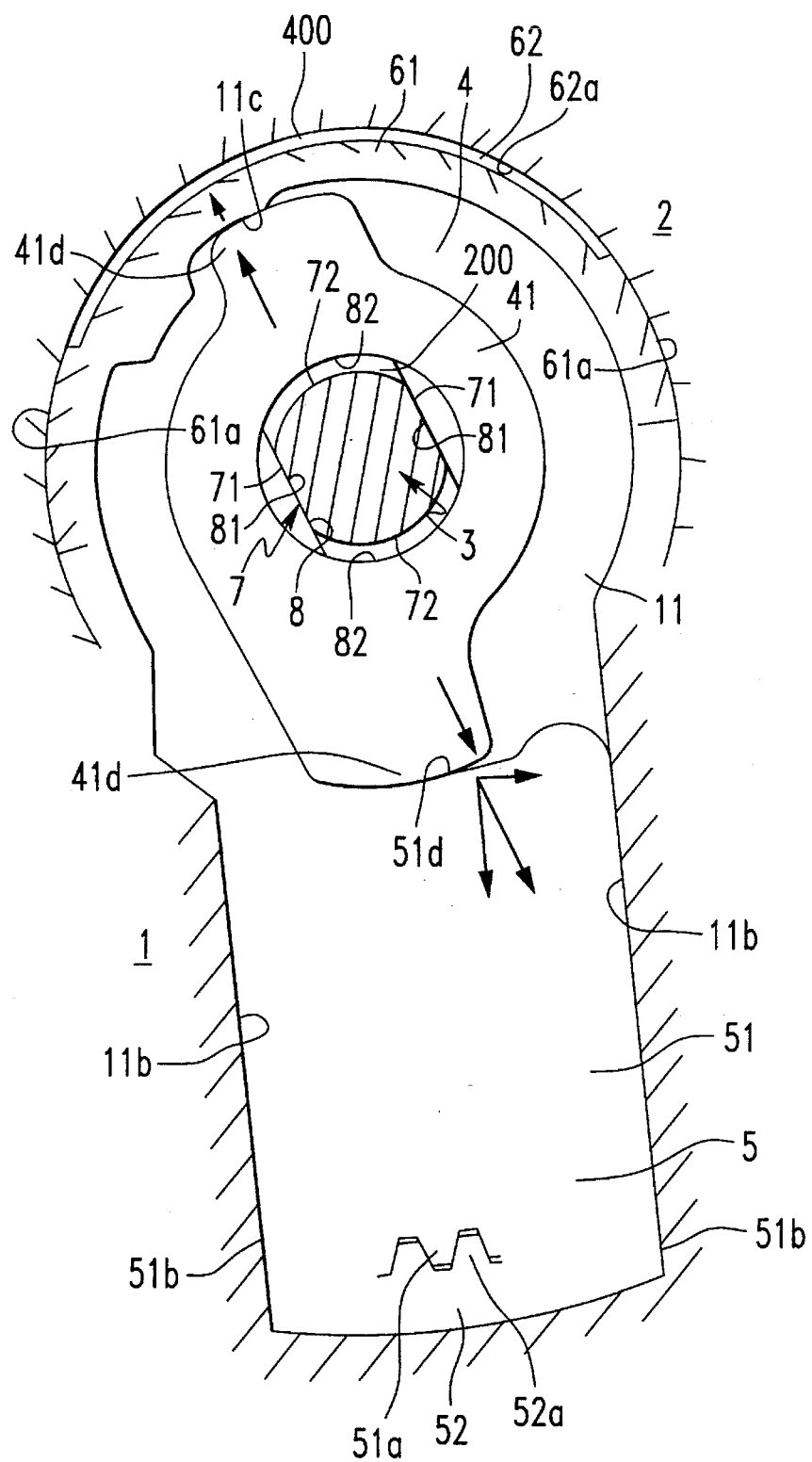
FIG. 6 is an enlarged fragmentary view of a principal portion of the seat apparatus shown in FIG. 4.

Next, referring first to FIGS. 4 to 6 inclusive, a seat apparatus according to a second embodiment of the present invention includes a lower arm 1 attaching to or fixing a seat cushion. The lower arm 1 is formed with a supporting portion 11 in which a rightward facing opening is defined. An upper arm 2 for attaching to or fixing a seat-back is also formed with a supporting portion 21 in which a leftward facing opening is defined. The lower arm 1 and the upper arm 2 are arranged in a side-by-side relationship, thereby establishing a space 100 between the supporting portions 11 and 12. A shaft 3 passes through the supporting portions 11 and 21 of the lower arm 1 and the upper arm 2, respectively, in such a manner that the upper arm 2 is set to be rotatable about the shaft 3 so as to make a reclining angle relative to the lower arm 1.

A pawl 51 and a ratchet 52 which constitute a locking mechanism 5, and a cam 41 which constitutes a releasing mechanism 4, are accommodated within the space 100. On the lower arm 1, there is formed an arcuate projection 61 which projects toward the supporting portion 21 so as to be co-axial with the shaft 3. In the upper arm 2, there is formed an arcuate projection 22 which projects toward the supporting portion 11 so as to co-axial with the shaft 3. The arcuate projection 22 also includes an arcuate groove 62 in the upper arm 2. The arcuate projection 61 of the lower arm 1 is fitted in the arcuate groove 62 of the upper arm 2 so as to be rotatable thereabout, thereby constituting a journal portion 6. As best shown in FIG. 6, a clearance 400 is defined between a pair of angularly spaced surfaces 61a of the arcuate projection 61 of the lower arm 1 which are in face-to-face contact with an outer wall 62a of the groove 62 in the upper arm 2.

The locking mechanism 5 includes the pawl 51 with a geared portion 51a and the ratchet 52 with a geared portion 52a. The curvature of the geared portion 51a of the pawl 51 and the curvature of the geared portion 52a of the ratchet 52 have a common axis which is coaxial with the shaft 3. The pawl 51 is held between an inner side 11a of the supporting portion 11 an inner side 21a of the supporting portion 21 and is also slidable in the lengthwise direction of the lower arm 1 along a pair of spaced inner faces 11b. Thus, the pawl 51 is movably mounted in the lower arm 1. It is to be noted that the pawl 51 has a pair of side surfaces 51b and each of the side surfaces 51b is set to slide along the corresponding inner surface 11b of the lower arm 1 in a face-to-face contact manner.

The releasing mechanism 4 includes the cam 41 and an operating lever 42. The cam 41 having a surface 41d is rotatable together with the shaft 3 so as to be brought into engagement or disengagement at the surface 41d with a back surface 51d of the pawl 51. The operating lever 42 is connected to the shaft 3 so as to be rotated in unison and has a slot 42a with which a pin 90 on the pawl 51 is in sliding engagement, and when the lever 42 is rotated the resultant rotation brings about a movement of the pawl 41.

The shaft 3 is formed thereon with a connecting portion 7, the cross-section of which is constituted by a pair of parallel flat surfaces 71 and a pair of arcuate surfaces 72. The cam 41 is formed therein with an aperture 8 enclosed by a pair of parallel flat peripheries 81 and a pair of arcuate peripheries 82. Under the illustrated condition, each flat periphery 81 of the aperture 8 of the cam 41 is in sliding engagement with the corresponding flat surface 71 of the connecting portion 7 of the shaft 3, and the curvature of each arcuate periphery 82 is set to be larger than that of the corresponding arcuate surface 72 so as to define therebetween a clearance 200.

When the surface 51d of the pawl 51 is in engagement with the lower portion 41d of the cam 41, an upper portion 41d' of the cam 41 is set to be in engagement with a cam surface 11c of the supporting portion 11 of the lower arm 1. The engagement between the cam 41 and the cam surface 11c of the supporting portion 11 of the lower arm 1 brings about a movement of the lower arm 1 in the radial direction of the shaft 3, and the engagement between the cam 41 and the surface 51d of the pawl 51 brings about a movement of the cam 41 in the radial direction of the shaft 3. The profile of the surface 51d of the pawl 51 is determined in accordance with the contact point between the pawl 51 and the cam 41 when the cam 41 contacts the pawl 52, which is offset from a line which connects the shaft 3 and the meshing portion between the pawl 51 and the ratchet 52.

While each of the pawls 51 is prevented from being moved as illustrated, the reclining movement of the upper arm 2 relative to the lower arm 1 cannot occur. When the shaft 3 is rotated in the counter-clockwise direction in FIGS. 1 and 3, the cam 41 is also rotated together with the shaft 3 in the counter-clockwise direction, which results in the contact between the cam 41 and the pawl 51 being released, and the pawl 51 is brought into movement toward the shaft 3. Thus, the ratchet 52 is disengaged from the pawl 51, thereby permitting upper arm 2 to recline relative to the lower arm 1. It is to be noted that the clockwise rotation of the resultant shaft 3 will bring about the illustrated condition.

Even though the design relationship between the cam 41 and each cam surface 11c of the lower arm 1 and the surface 51d of the pawl 51 is not established due to measuring error in each cam 41, the lower arm 1, and the pawl 51, the space 200 enables the movement of the cam 41 relative to the shaft 3. Thus, the cam 41 can be brought into contact with the surface 11c of the lower arm 1 and the surface 51d of the pawl 51 concurrently or simultaneously. In light of the fact that the point at which the cam 41 contacts the pawl 51 is offset toward the side 11b of the lower arm 1 from a line which connects the shaft 3 and the meshing portion between the pawl 51 and the ratchet 52, the meshing engagement between the pawl 51 and the ratchet 52 is strengthened as well as the side face 51b of the pawl 51 which is brought into contact with the side 11b of the lower arm 1 due to a horizontal component of the force. When the lower arm 1 is urged, due to the resultant reaction force, the cam 41 is moved relative to the shaft 3, thereby moving the upper arm 2 relative to the lower arm 1 via the pawl 51 and the ratchet 52. Thus, the pair of angularly spaced surfaces 61a of the arcuate projection 61 of the lower arm 1 are brought into face-to-face engagement with an outer wall 62a of the groove 62 in the upper arm 2. Thus, the relationship between the lower arm 1 and the upper arm 2 is in effect immovable, whereby an idle movement of the upper arm 2 relative to the lower arm 1 can be prevented.

The invention has thus been shown and described with reference to specific embodiments. It should be noted, however that the invention is in no way limited to the details of the illustrated structures. Changes and modifications may be made without departing from the scope of the appended claims.

What is claimed is:

1. A seat apparatus comprising:

a lower arm for attaching a seat cushion;

an upper arm for attaching a seat-back;

a shaft passing through the lower arm and the upper arm, said shaft being rotatably disposed in the lower arm and fixed to the upper arm for unitary rotation therewith, the shaft having a connecting portion with a pair of opposed parallel flat surfaces defining a first width of the connecting portion in cross section and a pair of opposed arcuate surfaces connecting the parallel flat surfaces at opposite ends defining a second width in cross-section substantially transverse to the first width;

a locking mechanism disposed between the lower arm and the upper arm, the locking mechanism including pawl means having one or more pawls movable into and out of meshing engagement with a ratchet; and a cam having an aperture mounted on the connecting portion of the shaft, the aperture having a first width defined by a pair of opposed flat peripheral surfaces and a second width substantially transverse to the first width defined by a pair of opposed arcuate peripheral surfaces joining opposite ends of the flat peripheral surfaces, said second width of the aperture being greater than the second width of the connecting portion of the shaft to define a clearance between the respective opposed arcuate surfaces of the shaft and the aperture, the first width of the aperture being dimensioned to slidably engage the opposing flat surfaces of the shaft to permit sliding movement of the cam relative to the shaft in the direction of the second widths, said cam having an outer surface configured to engage the pawl means for moving all of the one or more pawls of the pawl means into meshing engagement with the ratchet upon rotation of the shaft in one direction, and for moving all of the one or more pawls of the pawl means along said axis out of meshing engagement with the ratchet upon rotation of the cam in the opposite direction, the configured outer surface of the cam and the aperture being oriented relative to one another to permit a direction of sliding movement of the cam relative to the shaft corresponding to the direction of movement of all of the one or more pawls of the pawl means being pressed by the cam upon rotation of the cam.

2. A seat apparatus comprising:

a lower arm for attaching a seat cushion;

an upper arm for attaching a seat-back;

a shaft passing through the lower arm and the upper arm, said shaft being rotatably disposed in the lower arm and fixed to the upper arm for unitary rotation therewith, the shaft having a connecting portion with a pair of opposed parallel flat surfaces defining a first width of the connecting portion in cross section and a pair of opposed arcuate surfaces connecting the parallel flat surfaces at opposite ends defining a second width in cross-section substantially transverse to the first width;

a locking mechanism disposed between the lower arm and the upper arm, the locking mechanism including a pair of pawls movable in diametrically opposite directions along an axis into meshing engagement and out of meshing engagement with a ratchet; and a cam having an aperture mounted on the connecting portion of the shaft, the aperture having a first width defined by a pair of opposed flat peripheral surfaces and a second width substantially transverse to the first width defined by a pair of opposed arcuate peripheral surfaces joining opposite ends of the flat peripheral surfaces, said second width of the aperture being greater than the second width of the shaft to define a clearance between the respective opposed arcuate surfaces of the shaft and the aperture, the first width of the aperture being dimensioned to slidably engage the opposing flat surfaces of the shaft to permit sliding movement of the cam relative to the shaft in the direction of the second widths, said cam having an outer cam surface configured to engage the pair of pawls for moving the pawls in opposite directions into meshing engagement with the ratchet upon rotation of the cam in one direction and move the pawls out of meshing engagement with the ratchet upon rotation of the cam in the opposite direction, said configured outer cam surface and the aperture being oriented relative to one another to position the opposed flat peripheral surfaces defining the first width substantially parallel with said axis to permit sliding movement of the cam relative to the shaft along said axis when the outer cam surface engages the pair of pawls upon rotation of the cam.

3. A seat apparatus comprising:

a lower arm for attaching a seat cushion, said lower arm having a first supporting portion with a cam surface, a surface spaced from the cam surface and an opening;

an upper arm for attaching a seat-back, said upper arm having a second supporting portion with an opening and an outer wall;

a shaft passing through the openings of the first and second supporting portions, said shaft being rotatably disposed in the opening of the first supporting portion of the lower arm and fixed in the opening of the second supporting portion for unitary rotation with the upper arm, the shaft having a connecting-portion with a pair of opposed parallel flat surfaces defining a first width of the connecting portion in cross section and a pair of opposed arcuate surfaces connecting the parallel flat surfaces at opposite ends defining a second width in cross-section substantially transverse to the first width;

a locking mechanism disposed between the lower arm and the upper arm, the locking mechanism including pawl means having a cam surface, said pawl means being movable along an axis into and out of meshing engagement with a ratchet;

a cam having an upper cam surface portion and a lower cam surface portion, the upper cam surface portion engaging the cam surface of the first supporting portion of the lower arm to keep the spaced surface of the lower arm in contact with the outer wall of the upper arm when the lower cam surface portion of the cam engages the cam surface of the pawl means, the cam having an aperture mounted on the connecting portion of the shaft, the aperture having a first width defined by a pair of opposed flat peripheral surfaces and a second width substantially transverse to the first width defined by a pair of opposed arcuate peripheral surfaces joining opposite ends of the flat peripheral surfaces, said second width of the aperture being greater than the second width of the connecting portion of the shaft to define a clearance between the respective opposed arcuate surfaces of the shaft and the aperture, the first width of the aperture being dimensioned to slidably engage the opposing flat surfaces of the shaft to permit sliding movement of the cam relative to the shaft in the direction of the second widths, said cam having an outer surface of the lower cam surface portion configured to engage the pawl means for moving the pawl means into meshing engagement with the ratchet upon rotation of the shaft in one direction, and for moving the pawl means out of meshing engagement with the ratchet upon rotation of the cam in the opposite direction, the upper and lower cam surface portions of the cam and the aperture of the cam being oriented relative to one another to position the opposed flat surfaces defining the first widths substantially parallel with said axis to permit sliding movement of the cam relative to the shaft along said axis when the cam engages the pawl means upon rotation of the cam.

4. A seat apparatus in accordance with claim 3, wherein the upper arm has an arcuate groove; the lower arm having an arcuate projection movably fitted in the arcuate groove, the lower arm having a slot, the pawl means having a pawl positioned to be guided along the slot, the cam having a first and second surface in engagement with the arcuate projection between the lower arm and the upper arm and the pawl for meshing engagement between the pawl and the ratchet.

\* \* \* \* \*

UNITED STATES PATENT AND TRADEMARK OFFICE
CERTIFICATE OF CORRECTION

PATENT NO. : 5,622,407
DATED : April 22, 1997
INVENTOR(S) : Yukifumi Yamada et al.

It is certified that error appears in the above-indentified patent and that said Letters Patent is hereby corrected as shown below:

Claim 2, column 7, line 6, change "connecting-portion" to --connecting portion--.

Signed and Sealed this

First Day of July, 1997

Attest:

BRUCE LEHMAN

*Attesting Officer*   *Commissioner of Patents and Trademarks*